United States Patent [19]

Lockery

[11] 4,261,195
[45] Apr. 14, 1981

[54] TRANSDUCER BRIDGE CIRCUIT ARRANGEMENT AND METHOD

[75] Inventor: Harry E. Lockery, Sudbury, Mass.

[73] Assignee: Hottinger Baldwin Measurements, Inc., Framingham, Mass.

[21] Appl. No.: 13,395

[22] Filed: Feb. 21, 1979

[51] Int. Cl.³ .............................................. G01L 1/22
[52] U.S. Cl. ...................................... 73/1 B; 73/765; 177/211
[58] Field of Search ................. 73/765, 1 B; 177/211; 323/75 R, 75 A, 75 N

[56] References Cited

U.S. PATENT DOCUMENTS

| | | | |
|---|---|---|---|
| 3,173,507 | 3/1965 | Clamp | 323/75 A |
| 3,533,481 | 10/1970 | Paelian | 177/211 X |
| 3,692,129 | 9/1972 | Pratt et al. | 177/211 |
| 3,990,032 | 11/1976 | Fish et al. | 177/211 X |

Primary Examiner—A. D. Pellinen
Attorney, Agent, or Firm—W. G. Fasse; D. F. Gould

[57] ABSTRACT

A transducer bridge circuit arrangement which may include a plurality of individual bridge circuits is improved by standardizing the source resistance and open circuit sensitivity of each bridge circuit in a group of such circuits. For this purpose a small resistor is connected in series with one or both output terminals of each individual bridge circuit, or resistors may be inserted in series with the bridge excitation terminals. Thus, the output signal sensitivity and source resistance are adjusted to a standard ratio value and the prior art adjustment for so-called corner sensitivity in electronic scales has been eliminated or at least substantially reduced where strain gauge load cells are employed in multiple transducer installations.

8 Claims, 3 Drawing Figures

TRANSDUCER BRIDGE CIRCUIT ARRANGEMENT AND METHOD

BACKGROUND OF THE INVENTION

The present invention relates to an improved transducer bridge circuit arrangement and to a method for accomplishing the improvement. The invention is generally useful for bridge circuits and is especially useful in electronic scales.

Many strain gauge load cell scales are being produced today, employing a plurality of load cells in respective bridge circuit configurations. A "load cell" in this context is considered to be a bridge circuit arrangement comprising four strain gauge elements. For example, one load cell may be employed at each corner of a platform scale. The load capacity of present day scales covers a wide range of approximately 10 lbs. to over 200,000 lbs. In virtually all scales where a high weighing accuracy is required, some adjustment must be made on each of the individual load cells to assure that the proper scale performance is achieved independently of the point where the weight or load is applied to the scale.

Heretofore it has been conventional to connect potentiometers in series with the supply voltage input terminals of each individual transducer bridge circuit load cell. The adjustment of these potentiometers effectively adjusts the sensitivity of the individual transducer bridge, thereby matching the sensitivity to that of the other transducer bridges used in a multi-cell bridge system.

The use of a plurality of potentiometers is expensive because it requires not only the addition of expensive potentiometers. It also requires substantial time necessary for the adjustment which may have to be repeated several times until a bridge circuit arrangement comprising a plurality of individual bridges has been adjusted as required. Further, the use of such potentiometers decreases the system reliability because potentiometers are inherently unreliable especially where the scales are used in an environment which is not advantageous for the operation of the potentiometers. For example, moisture and dirt may enter into the potentiometers thereby still further reducing their reliability.

OBJECTS OF THE INVENTION

In view of the foregoing it is the aim of the invention to achieve the following objects singly or in combination:

- to either eliminate or substantially reduce the need for the above mentioned corner adjustments;
- to avoid the use of additional components in the scale system such as potentiometers;
- to avoid using the above mentioned adjustment potentiometers by using simple, fixed resistors in the individual load cells; and
- to assure, that all individual bridge circuits will have a standardized output sensitivity thereby obviating the use of adjustment potentiometers.

SUMMARY OF THE INVENTION

According to the invention there is provided a transducer bridge circuit arrangement comprising a plurality of individual bridge circuits, each bridge circuit having four resistive strain gauge elements interconnected to form operating voltage supply bridge terminals and measured output value bridge terminals as well as standardizing fixed resistor means connected in series with said measured output value bridge terminals or in series with bridge supply or excitation terminals whereby a constant output is enforced for all bridge circuits of a bridge circuit arrangement, thus E/R is constant wherein E is the adjusted open circuit output sensitivity in millivolt/volt at a rated load and wherein R is the adjusted source resistance in ohms of the respective bridge circuit.

According to the invention there is further provided a method for standardizing the outputs of individual bridge circuits. The invention also relates to such individual bridge circuits which have been standardized according to the invention and which are used in a bridge circuit arrangement having a plurality of such individual bridge circuits. The method according to the invention comprises the steps of selecting a standard ratio value in the dimension millivolt/volt/ohm with regard to the type of bridge circuit involved, applying a standard force to each individual transducer bridge circuit, measuring the open circuit output sensitivity in millivolt/volt of each transducer bridge circuit, measuring the original transducer source resistance of each transducer bridge circuit, and connecting in accordance with said resistance measurement, fixed resistance means in series with the output terminals of each transducer bridge circuit or in series with the bridge excitation terminals such that the expression E/R becomes a constant for all transducer bridge circuits of a bridge circuit arrangement, wherein E is said output sensitivity in millivolt/volt and wherein R is the source resistance of each individual bridge circuit whereby the open circuit output and resistance relationship is adjusted to said standard value.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE PRIOR ART

Figure 1:
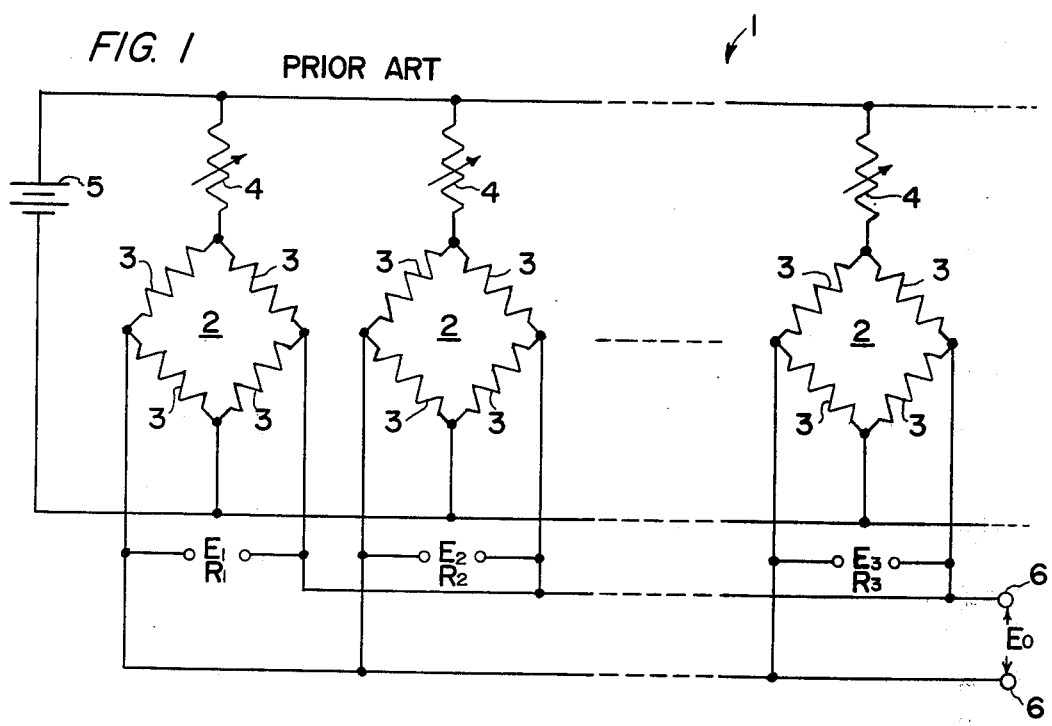
FIG. 1 is a conventional multiple bridge circuit arrangement with potentiometers connected in series with the operating voltage input terminals of each individual bridge circuit.

FIG. 1 represents a multiple bridge circuit arrangement 1 according to the prior art comprising a plurality of individual transducer bridge circuits or cells 2. Three of such cells are shown, however, any desired number of individual bridge circuits may be connected in parallel. Each bridge circuit 2 comprises four strain gauge elements 3. Each bridge circuit 2 is connected in series with a potentiometer 4 which in turn connects the respective bridge circuit to a, e.g. supply voltage battery 5. All output terminals 6 of the individual bridges 2 are connected in parallel. The total output voltage $E_o$ of the bridge circuit arrangement 1 is measured across the output terminals 6. However, each individual bridge circuit also provides across its individual output terminals an open circuit output voltage $E_1$, $E_2$, $E_3$, and so forth. Similarly each individual bridge circuit has a source resistance $R_1$, $R_2$, $R_3$, and so forth across its individual output terminals.

Figure 2:
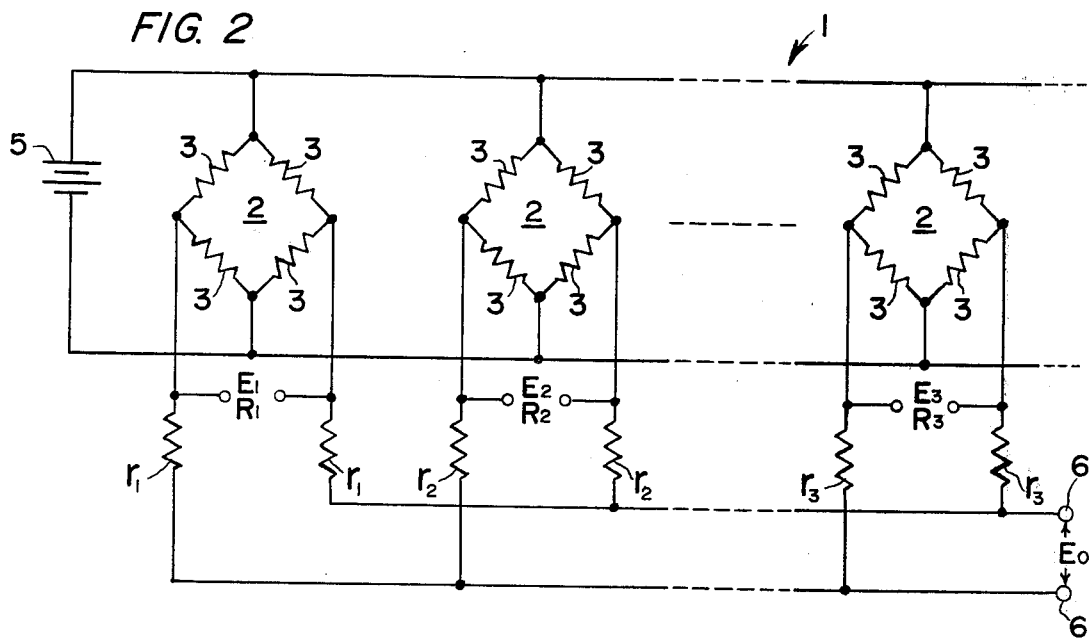
FIG. 2 is a multiple bridge circuit arrangement modified in accordance with one embodiment of the present invention.

FIG. 2 illustrates a circuit arrangement similar to that of FIG. 1, however, modified in accordance with the present invention. The same elements are provided with the same reference numbers. However, the potentiometers 4 have been omitted in FIG. 2. According to one form of the invention, compensating resistors $r_1$, $r_2$, and $r_3$ are connected in series with the output terminals of each individual bridge circuit.

The output signal resulting from two conventional bridge circuits connected in parallel may be expressed as follows:

$$E_0 = \frac{E_1 R_2 + E_2 R_1}{R_1 + R_2} \quad (1)$$

Similarly where three transducer bridge circuits are connected in parallel as shown in FIG. 1 the output voltage $E_o$ across the output terminal 6 may be expressed as follows:

$$E_0 = \frac{E_1 R_2 R_3 + E_2 R_1 R_3 + E_3 R_1 R_2}{R_2 R_3 + R_1 R_3 + R_1 R_2} \quad (2)$$

In the foregoing equation $E_1$, $E_2$, and $E_3$, are the open circuit output signals from each transducer as indicated in FIG. 1 representing the load carried by each transducer. The resistors $R_1$, $R_2$, and $R_3$ are the source or terminal resistances of each transducer looking back into the signal terminals.

Referring to equation (1) relating to two parallel bridge circuits, and assuming that the resistances $R_1$ and $R_2$ are exactly equal to each other, equation (1) may be rewritten as follows:

$$E_0 = \frac{E_1 + E_2}{2} \quad (3)$$

Similarly, where all terminal or source resistances are the same in the case of three bridge circuits connected in parallel equation (2) may be simplified as follows:

$$E_0 = \frac{E_1 + E_2 + E_3}{3} \quad (4)$$

If the terminal or source resistances of all transducers are exactly equal, the outputs of the transducers are simply averaged as exemplified in the above equation. Accordingly, the net output is equal to the sum of the outputs of all individual transducers in the scale system divided by the number of transducers in the system.

If the sensitivities of all the individual transducers are identical, then it does not make any difference where the load is placed on the scale platform. If the load is placed in the center of the platform all three load cells share exactly one third of the load. However, the output would be the same even if the load were applied to only one transducer due to the above averaging and the fact that all transducers have exactly the same sensitivity and the same source resistance. In this situation a perfect corner adjustment exists and the present invention is based on this recognition.

In the prior art, however, this situation is not attained and efforts have been made to provide a compensation by the potentiometers 4 because the transducer source impedances vary from unit to unit in the order of ±0.5% and because standard precision transducer calibration tolerances are as high as ±0.1%. Accordingly, heretofore, it was not possible to count on matched source resistances and identical sensitivities. For this reason said adjustment potentiometers 4 have been used heretofore.

Referring to equation (1) and assuming that the open circuit sensitivity $E_1$ of the first transducer is 10% higher than the open circuit sensitivity $E_2$ of the second transducer and further that the transducer source impedances $R_1$, and $R_2$ are equal, the invention teaches in its first embodiment raising the impedance of the first transducer to a value 10% higher than its original value. Thus, the numerator terms in equation (1) become equivalent and it does not make any difference whether the load is equally distributed between the transducer bridge circuits or is completely applied to one or the other of the transducer bridge circuits. The following example may facilitate understanding the first teaching:

assume the following original values, prior to compensation
sensitivity $E_1 = 1.1$
sensitivity $E_2 = 1.0$
source resistance $R_1 = R_2 = 100$,
now the output for this relationship is expressed by:

$$E_0 = \frac{E_1 R_2 + E_2 R_1}{R_1 + R_2}$$
$$= \frac{(1.1)(100) + (1)(100)}{200}$$
$$= \frac{110 + 100}{200} = 1.05$$

Note that the left hand numerator term is larger than the right hand numerator term. As the load is transferred to the $E_1$ load cell (left hand term), the output of the scale will increase. This must be eliminated.

Now let us set $R_1$ to 110 ohms, leaving everything else the same. The new expression for the scale output is:

$$E_0 = \frac{(1.1)(100) + 1(110)}{210}$$
$$= \frac{110 + 110}{210} = 1.0476$$

From the above example it will be noted that the two numerator terms are identical and hence it does not make any difference whether the load is equally distributed or whether it is totally taken up by one or the other of the transducer bridge circuits.

In view of the above, one embodiment of the invention teaches that if a transducer has a high open circuit output its source resistance should also be relatively high. Thus, the invention standardizes the transducer outputs on a millivolt/volt/ohm basis in said one embodiment. With the foregoing teaching in mind, the numerators and denominators of the expressions (1) and (2) set forth above may be divided by $R_1 \times R_2$ and $R_1 \times R_2 \times R_3$ respectively.

$$E_0 = \frac{\frac{E_1}{R_1} + \frac{E_2}{R_2}}{\frac{R_1 + R_2}{R_1 R_2}} \quad (1')$$

$$E_0 = \frac{\frac{E_1}{R_1} + \frac{E_2}{R_2} + \frac{E_3}{R_3}}{\frac{R_2R_3 + R_1R_3 + R_1R_2}{R_1R_2R_3}} \qquad (2')$$

In order to avoid further corner adjustment of the type necessary in the prior art, the invention makes the numerator terms to be equivalent to each other:

$$\frac{E_1}{R_1} = \frac{E_2}{R_2} = \frac{E_3}{R_3} = \left(\frac{E}{R}\right)_s \qquad (3)$$

by adjusting the values of $R_1$, $R_2$, and $R_3$.

The fact that the denominator of both the expressions (1') and (2') has changed because of the new values of $R_1$, $R_2$, $R_3$ is not significant because only a scale factor is involved and that factor affects each of the individual transducers in the same manner.

The standardization taught according to the invention as set forth above may be accomplished by selecting a standard $$\left(\frac{E}{R}\right)_s$$

value such as 0.0056 for transducers having a nominal open circuit output sensitivity of two millivolts/volts at a rated load and a nominal source resistance of 350 ohms. Now each transducer would be loaded to its nominal load and the open circuit sensitivity would be measured very accurately. The original transducer source resistances are also measured and these resistances are adjusted by adding resistances in series with each of the output leads. These small resistances are shown in FIG. 2 as $r_1$, $r_2$, and $r_3$. The size of these resistors $r_1$; $r_2$; $r_3$; . . . is selected so that the standard value $$\left(\frac{E}{R}\right)_s$$

becomes 0.0056. For example, a transducer with an output sensitivity of 2.002 millivolt/volt (0.1% above nominal sensitivity) should have a total source resistance of $$R = \frac{2.002}{0.0056} = 357.5 \text{ ohms} \left(\frac{E}{R}\right)_s = \frac{2.002}{357.5} = 0.0056$$

A transducer with an output of 1.998 should have a total source resistance of:

$$R = \frac{1.998}{0.0056} = 356.78 \text{ ohms} \left(\frac{E}{R}\right)_s = \frac{1.998}{356.78} = 0.0056$$

As mentioned, the original source resistances of the transducers are measured and then the two small resistances are added in series in the output terminals so that the total source resistance becomes equivalent to the values calculated above.

If the so compensated transducer bridges are wired into the circuit arrangement shown in FIG. 2, the output expression will become $$E_0 = \frac{\frac{E_1}{R_1 + 2r_1} + \frac{E_2}{R_2 + 2r_2} + \frac{E_3}{R_3 + 2r_3}}{1/R} =$$

$$\frac{\left(\frac{E}{R}\right)_s + \left(\frac{E}{R}\right)_s + \left(\frac{E}{R}\right)_s}{1/R}$$

Where: $\frac{E_1}{R_1 + 2r_1} = \frac{E_2}{R_2 + 2r_2} = \frac{E_3}{R_3 + 2r_3} = \left(\frac{E}{R}\right)_s$ In the above equation, R is a constant representing the parallel combination of each of the original source resistances with their individual compensating resistances connected in series with each of the original source resistance; i.e., $$\frac{1}{R} = \frac{1}{R_1 + 2r_1} + \frac{1}{R_2 + 2r_2} + \frac{1}{R_3 + 2r_3}.$$

From the two above equations it is noted that the numerator terms are equal to the standardized value $E/R_s$ in millivolt/volt/ohm terms. The numerator terms are equal and it does not make any difference where the load is located on the scale platform.

In view of the foregoing disclosures it will be appreciated, that by connecting small fixed resistances in series with the output terminals of the transducer the output sensitivity and the source resistance relationship have been standardized to a standard ratio value for all transduces so treated. When such "standardized" transducers are connected in a multi-transducer bridge circuit arrangement, further adjustments have been obviated for most practical purposes unless the mechanical system of the scale requires an additional adjustment by conventional means as described above with reference to FIG. 1. Even in those instances where a subsequent conventional adjustment may be necessary, it will be less involved in terms of repeated adjustments than heretofore because the operator will not be required to adjust for differences between individual load cells but merely for the mechanical system of the particular scale. In systems in which the mechanical structure does not contribute to the corner sensitivity, no further adjustment is required where the standardized transducer bridge circuits are used according to the invention.

In the light of the foregoing disclosure, the first embodiment of the invention standardizes the transducer output in terms of millivolt/volt/ohm by means of adjusting each transducer's source resistance $R_1$, $R_2$, $R_3$ to accomplish $$\left(\frac{E}{R}\right)_s$$

as a constant value.

Figure 3:
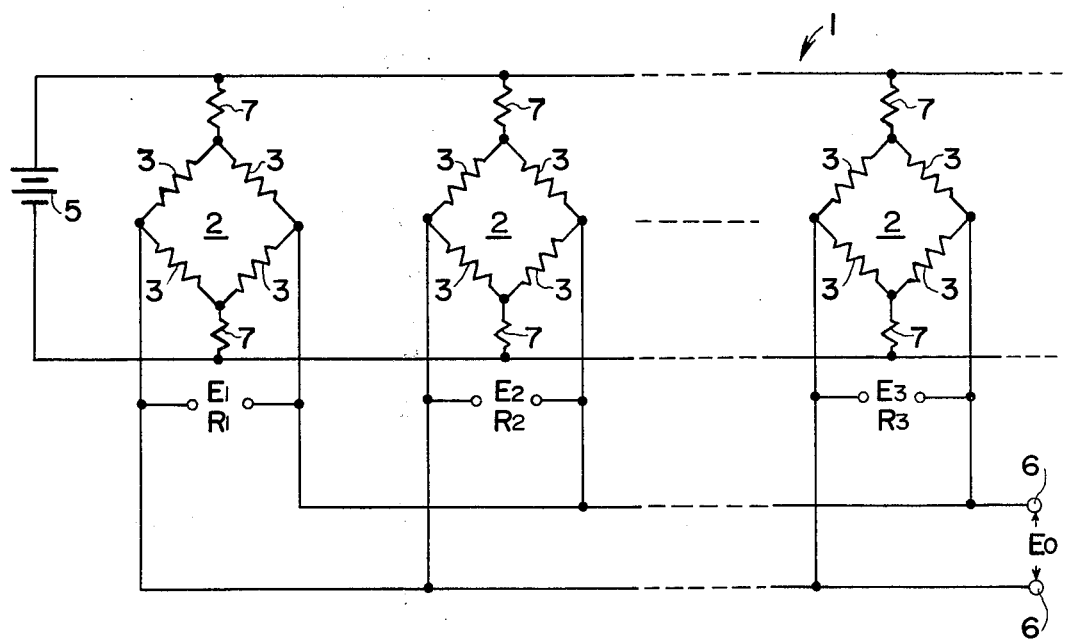
FIG. 3 is a multiple bridge circuit arrangement modified in accordance with a further embodiment of the present invention.

The same standardized value $$\left(\frac{E}{R}\right)_s$$

may be achieved according to a further embodiment of the invention employing the adjustment of each transducer's open circuit sensitivity in conjunction with its known source resistance. For this purpose the invention replaces the expensive adjustment potentiometers 4 of the prior art by fixed resistances 7 as shown in FIG. 3. In the prior art the potentiometers 4 are adjusted without regard to the transducer source resistance which may vary by as much as +0.5% from transducer to transducer. Hence, the standardized condition $$\left(\frac{E}{R}\right)_s = \text{constant}$$

is not satisfied in the prior art.

Referring again to equations (1') and (2') set forth above, the numerators have terms $E_1/R_1$, $E_2/R_2$, and $E_3/R_3$. The denominator term is unimportant for it merely represents a scale factor. The objective of eliminating or at least reducing "corner adjustment" in multi-transducer systems is to make the terms $E_1/R_1$, $E_2/R_2$, $E_3/R_3$, etc., equal to each other and to some standard ratio value $$\left(\frac{E}{R}\right)_s.$$

The second embodiment achieves this objective by adjusting the open circuit sensitivities $E_1$, $E_2$, and $E_3$. As previously explained, it is necessary to make each of the numerator terms equivalent to any other numerator term. Using the same standard value of $$\left(\frac{E}{R}\right)_s = 0.0056,$$

it is necessary to measure accurately each transducer's source resistance and adjust the open circuit sensitivity of each transducer in accordance with the relationship:

E/R = 0.0056

E = 0.0056R

In doing so, the numerators, $E_1/R_1$, $E_2/R_2$, $E_3/R_3$, become equal to each other and it makes no difference whether the load is equally distributed on the scale or whether it is totally taken up by any one of the transducers.

The open circuit transducer sensitivities are adjusted by choosing a value for the respective resistor 7 required to achieve the desired sensitivity. Variations in the values of the resistor 7 have no effect whatsoever on the transducer source resistance. Hence, the open circuit transducer sensitivity may be adjusted independently of the bridge source resistance and the standardized ratio value $$\left(\frac{E}{R}\right)_s$$

may be readily achieved to be constant.

Although the invention has been described with reference to a specific example embodiment, it will be appreciated, that it is intended to cover all modifications and equivalents within the scope of the appended claims.

What is claimed is:

1. A method for standardizing the outputs of individual bridge circuits in a bridge circuit arrangement having a plurality of individual transducer bridge circuits, comprising the steps of selecting a standard ratio value $$\left(\frac{E}{R}\right)_s$$

in the dimension millivolt/volt/ohm, with regard to the type of bridge circuit involved, applying a standard force to each individual transducer bridge circuit, measuring the output sensitivity in millivolt/volt of each transducer bridge circuit, measuring the original transducer source resistance, and operatively connecting in accordance with said source resistance measurement, fixed standardizing resistance means in series with each individual transducer bridge circuit such that said expression $$\left(\frac{E}{R}\right)_s$$

becomes a constant for all transducer bridge circuits of a bridge circuit arrangement, wherein E is said output sensitivity in millivolt/volt and wherein R is the standardized source resistance of each individual bridge circuit, whereby the ratio of the open circuit output voltage to the source resistance is standardized to said standard value for all transducer bridge circuits so standardized.

2. The method of claim 1, comprising connecting said fixed resistance means in series with the output terminal means of each individual transducer bridge circuit.

3. The method of claim 1, comprising connecting said fixed resistance means in series with the power supply terminal means of each individual transducer bridge circuit.

4. A transducer bridge circuit arrangement comprising a plurality of individual bridge circuits, each bridge circuit having four transducer means interconnected to form operating voltage supply bridge terminal means, measured output value bridge terminals means and fixed, standardizing resistor means operatively connected in series with each individual bridge circuit, whereby a constant output is enforced for all bridge circuits of a bridge circuit arrangement, thus E/R=-constant wherein E is the output sensitivity in millivolt/volt at a rated load and R is the standardized source resistance, in ohms, of the respective individual bridge circuits.

5. The transducer circuit arrangement of claim 4, wherein said fixed, standardizing resistor means ($r_1$, $r_2$, etc.) are connected in series with said measured output value bridge terminal means.

6. The transducer bridge circuit arrangement of claim 4, wherein said fixed, standardizing resistor means (7) are connected in series with said operating voltage supply bridge terminal means.

7. The transducer bridge circuit according to claim 4, wherein said four transducer means are strain gages.

8. A transducer bridge circuit for a transducer bridge circuit arrangement including a plurality of such bridge circuits, said transducer bridge circuit comprising four transducer elements operatively interconnected to form operating voltage supply bridge terminal means and measured output value bridge terminal means, said transducer bridge circuit further comprising fixed, standardizing resistor means operatively connected in series with said transducer bridge circuit, said fixed series connected standardizing resistor means being so dimensioned that a constant output is enforced for a rated load applied to said transducer bridge circuit and relative to said plurality of bridge circuits, whereby E/R is a constant in which E is the output sensitivity in millivolt per volt at said rated load and R is the standardized source resistance in ohms, of said transducer bridge circuit.

* * * * *